United States Patent Office 3,000,227
Patented Sept. 19, 1961

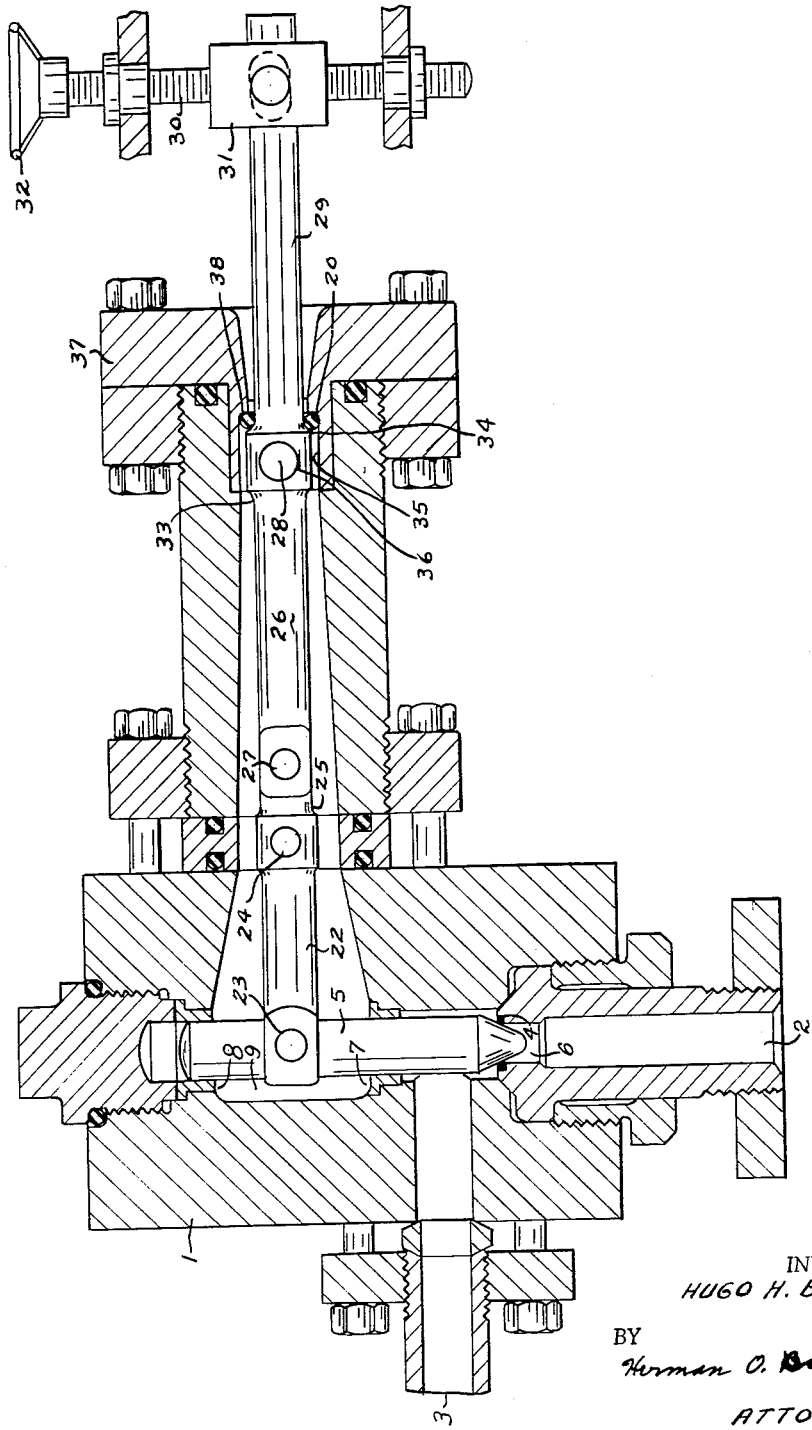

3,000,227
HIGH PRESSURE VALVE
Hugo H. Buchter, Dayton, Ohio, assignor to Monsanto Chemical Company, St. Louis, Mo., a corporation of Delaware
Filed June 27, 1957, Ser. No. 668,396
1 Claim. (Cl. 74—101)

This invention relates to high pressure valves and to a method of securing the valve stem against leakage. It is an object of the invention to provide a simple and economical type of valve which is strong enough to be used as a closure in high pressure operations, but which is much lighter and simpler in construction than has been possible by prior art methods.

Modern industrial operations, particularly in the chemical industry have been characterized by the use of higher and higher pressures, so that chemical processes operating at 25,000 to 35,000 pounds per square inch are becoming commonplace. However, it has been found that the vessels, piping and valves required for such operations must be built in exceedingly heavy and awkward forms to withstand the high pressures. Since valves are universally necessary to control the flow of liquids and gases, often at high temperature, in such systems, the industrial designers have faced particularly difficult problems with regard to such valves. In order to provide for valve stem movement from the interior to the exterior of the valve, and also to prevent leakage it has been necessary to use long packing glands with intricate forms of packing. Such extensive packing systems have made it physically difficult to accomplish the necessary valve stem movement, and have also introduced problems in the necessity for frequent changes of packing, with consequent shut down of the apparatus.

It has now been found that a high pressure valve may be built in a simple form by providing the stem of high pressure valve with a lever system to actuate the valve stem, the lever passing out of the valve body by means of a resilient seal. The invention therefore constitutes a mechanically actuated valve, comprising a valve body provided with a valve seat therein, inlet and outlet openings to said body on each side of said seat, a valve stem carrying a seat-containing end and slidably arranged within said body, lever and fulcrum means within said body. One end of said lever extends through an opening in said body, the other end of said lever being linked to said stem, said lever being provided with a circular section adjacent said fulcrum. The lever passing through the body is provided with sealing means adjacent said circular lever section, said sealing means abutting said valve body, and being adapted and arranged to contact the interior of said housing and to form a pressure-tight seal between said circular section and said housing.

The lever system is actuated from the exterior of the said valve body, with the passage of the lever out of the valve body being sealed by an O-ring. It has been found that such small angular motion of the lever permits adequate stem motion for any purpose. Furthermore, the valve stem motion may be a direct, straight line axial movement with respect to the stem, while the actuating motion of the lever is a small angular motion about a fulcrum. The pivot of the lever is located adjacent to the exterior wall of the valve, so that the O-ring sealing means may be located very close to the pivot and remain easily accessible from the exterior of the valve.

For a further understanding of the present invention reference is made to the accompanying drawing forming a part of the description.

The figure shows a longitudinal section of the high pressure valve employing the present resilient ring-type of seal for the actuating lever which moves the valve spindle. In this embodiment of the invention a multiple lever system is employed to achieve a greater actuating force on the valve spindle than could be provided by a single lever.

The figure shows in longitudinal section an embodiment of the invention in which numeral 1 represents a portion of the valve housing or body member, the same having an inlet opening 2 and an outlet opening 3. A seat 4 is provided therebetween, and is preferably a removable type of seat so that this part may be replaced as necessary. A valve stem 5 carries a seat contacting end 6. In order to provide a tight seal upon closure of the valve, the end 6 of valve stem 5 contacts valve seat 4 which is made of suitable material such as a plastic or elastomeric material, for example a polyfluoroethylene or rubber so as to withstand wear caused by repeated opening and closing of the valve. The valve stem 5 is slidably arranged for straight line motion by close fitting guide passages 7 and 8 located at the lower and upper portions, respectively, of valve stem 5, with a suitable clearance space 9 located between 7 and 8 in housing 1.

The figure illustrates the invention in which a double lever system is employed to obtain maximum stem movement, such as is desirable in a quick-acting valve. In this valve the housing 1 containing the valve stem and guides therefor is provided with two levers acting in conjunction. Lever 22 connects directly with valve stem 5 by means of a coupling 23. Lever 22 pivots about a fulcrum 24 and its outboard end 25 is joined to the second lever 26 by means of knuckle joint 27. Lever 26 oscillates angularly about a fulcrum 28 and is caused to oscillate in a small angle from its outboard end 29. The accurate control of the motion of lever 29 may be effected by a screw movement 30 which connects to lever 29 by means of a coupling 31. The screw 30 is turned by mechanical or hydraulic means or by a hand wheel 32.

The oscillatable lever 26 is provided with shoulders 33 and 34, these being of substantially circular cross section and of somewhat increased diameter, as compared with the lever diameter, such shoulder diameter, however, being sufficiently smaller than the size of opening 35 in the housing 1, so as to permit free oscillation of lever 26 about center 28. Coinciding with this center or fulcrum a pin 36 extends completely through the lever at the enlarged shoulder portion 33 and 34. Pin 36 is held in place by openings in a follower piece or gland 37, which carries bearing means for the pin 36. The follower 37 is also provided with a circular abutment 38 to provide a seal with shoulder 34. Between abutment 38 and shoulder 34 the resilient, elastic solid-section packing ring 20 is provided, as described above.

It will, of course, be understood by those skilled in the art that the metallic parts of my device will be constructed of suitable metals or alloys having a strength adequate to withstand the working pressure to which the valve will be subjected in use. In the operation of the present valve, as illustrated in the figure, angular motion is obtained by turning handwheel 32 applied to the outboard end of lever 29. This correspondingly results in angular motion of lever 32 which thus causes movement of the valve spindle 5. Since the relative lengths of the respective actuating levers may be made in any proportions which are desired, it is possible to produce either large effective forces upon the valve, or large travel of the stem. In the design of high pressure valves in accordance with the present invention, it is generally desirable that the longitudinal valve motion be from $1/16$ to $1/2$ inch. In the particular embodiment shown in the figure the present drawing making use of a 4:1 lever ratio, it is easily possible to seat the valve against a force of 10,000 pounds per square inch with an actuating force of 2,500 pounds, which later force may readily be obtained by hand pressure or by means of a screw of the type ordinarily employed on a valve bonnet. In proportioning the single or multiple levers employed in the present valve, it is desirable that the angular amplitude of the lever carrying the O-ring be rather low, usually less than about 10° of arc.

The present invention, particularly in the multiple lever embodiment, makes it possible to provide an effective seal while permitting motion of the valve stem. The individual requirements of large stroke and opening, or quick action as well as very large sealing force can all be attained without exceeding a safe angular motion of the O-ring surrounding the lever arm.

The valve spindle used in the present invention can be made solid or can have a longitudinal passage therethrough. In this way, a balanced spindle action is obtained, thus decreasing the force necessary to close the valve.

In addition to high pressure operation, these valves are very useful in vacuum work as well as general service operations. The advantage of this design is the elimination of conventional packings.

In the embodiments described herein, the angular motion imposed upon the lever system of the valve results in a straight line longitudinal motion of the valve stem which is caused to open, or to close, against valve seat 5, which opens or closes the valve and controls the flow of a fluid from conduit 2 to conduit 3. It has been found that systems of the present type may readily be sealed against working pressures of as high as 50,000 pounds per square inch. Examination of the structure shown in the drawing shows that the pressure of the fluid passing through the valve will be transmitted through the passages of the valve housing. In order to prevent leakage of fluid the O-ring 20 is forced against abutment 38 of the follower element 37 and against shoulder 34 of lever 26. By reason of the elasticity and resiliency of the material of which the O-ring is constructed, the same will be expanded radially both outwardly and inwardly, thus effectively sealing the crevices adjacent the lever shoulder and the follower against leakage. At the same time the oscillatory motion of the lever will not be impeded by pressure exerted by the O-ring, since such pressure is uniformly exerted over the entire circumference of the shoulder of abutment 38. Indeed, it has been found that there is very little difference in the amount of energy required to actuate the lever whether or not a high fluid pressure is present in the valve device.

What is claimed is:

A valve actuating device of the character described comprising a body, a stem slidably arranged within said body, lever and fulcrum means within said body comprising a first lever extending through an opening in said body, said lever being provided with a circular section adjacent said fulcrum, resilient sealing means adjacent said circular lever section, said sealing means abutting said body, and adapted and arranged to contact the interior of said body and to form a pressure-tight seal between said circular section and said body, said other end of said first lever being linked to a second lever and fulcrum means, said second lever being then linked to said stem.

References Cited in the file of this patent
UNITED STATES PATENTS

| | | |
|---|---|---|
| 674,696 | Gardenier | May 21, 1901 |
| 1,333,357 | White | Mar. 9, 1920 |
| 2,270,932 | Cornelius | Jan. 27, 1942 |
| 2,524,343 | Diener | Oct. 3, 1950 |
| 2,553,991 | Wagner et al. | May 22, 1951 |
| 2,597,709 | Dath et al. | May 20, 1952 |